UNITED STATES PATENT OFFICE.

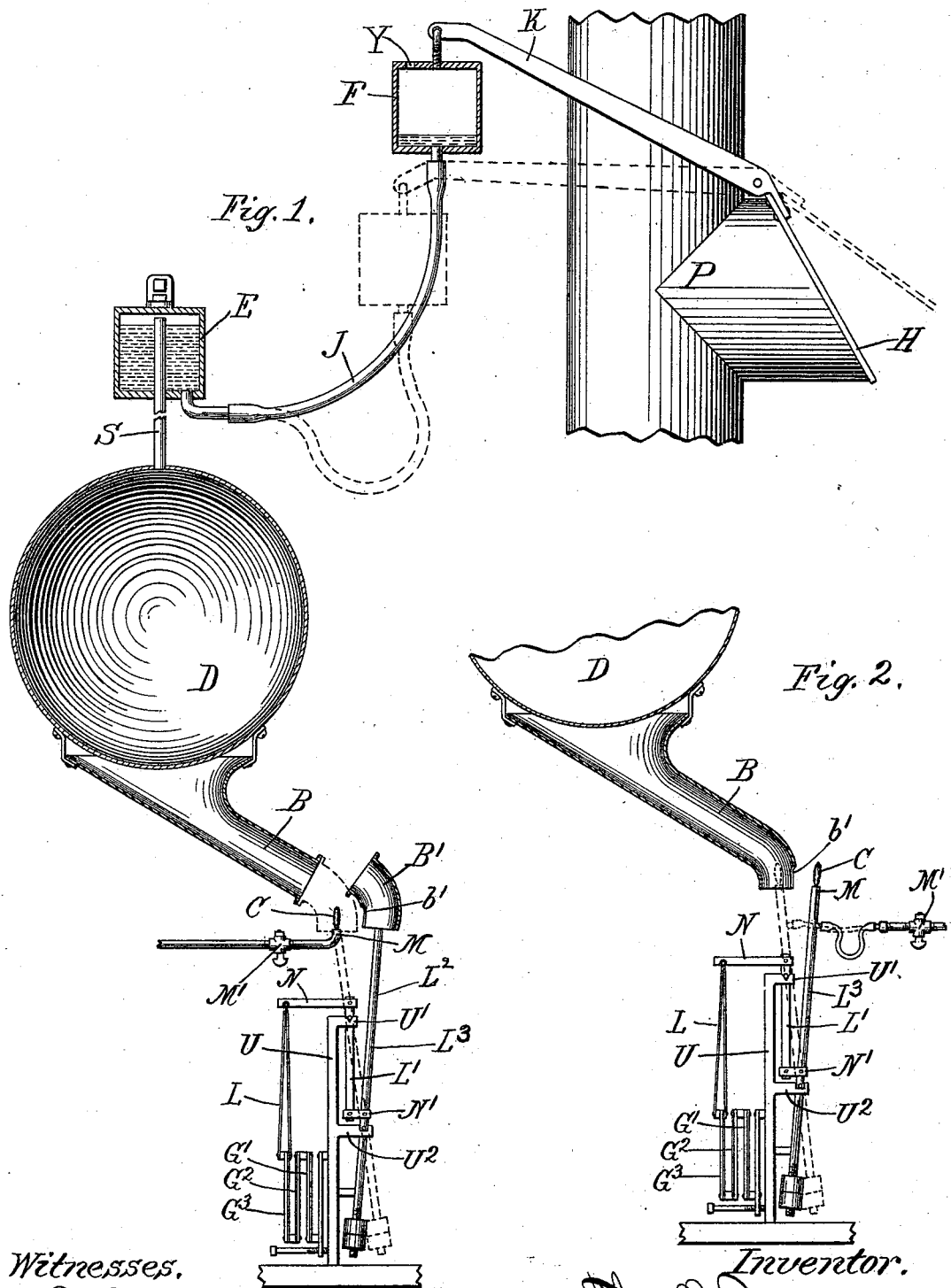

THOMAS O. PERRY, OF CHICAGO, ILLINOIS.

TEMPERATURE-REGULATOR.

SPECIFICATION forming part of Letters Patent No. 528,801, dated November 6, 1894.

Application filed October 2, 1893. Renewed September 15, 1894. Serial No. 523,163. (No model.)

*To all whom it may concern:*

Be it known that I, THOMAS O. PERRY, a citizen of the United States, residing at Chicago, county of Cook, and State of Illinois, have invented certain new and useful Improvements in Temperature-Regulators, which are fully set forth in the following specification, reference being had to the accompanying drawings, forming a part thereof.

This invention is a modification in respect to certain details of a device for regulating the temperature of an apartment, which is shown in my pending application, Serial No. 476,160, filed May 31, 1893.

In the drawings,—Figure 1 is a partly sectional elevation of my device, shown connected to a valve or damper the opening and closing of which affect the temperature of the apartment to be regulated. Certain air and water containing chambers and vessels and a duct which discharges against the air chamber are shown in vertical section. Fig. 2 is a detail elevation of a modification of the device.

In my pending application above mentioned, the regulation of temperature is effected by employing, to open and close a damper or valve which affects the temperature to be regulated, a chamber, preferably spherical, made of thin metal, whose contents, preferably air, by expansion and contraction, operates the damper, the necessary expansion and contraction of the air in the chamber being effected by a constant heating device (as a small gas jet), from which the chamber is shielded until the temperature of the apartment rises above the desired point, the shield being then removed by the operation of a thermostatic device having mechanical connections with the shield for that purpose; so that a very slight change of temperature in the apartment, sufficient only to cause the thermostat to move the very light shield a short distance, brings into operation, for the purpose of moving the damper, the very much greater force due to the heating of the chamber by the heating device to which it is exposed when the shield is removed. In the present invention, I employ the same means for operating the damper,—that is, an air chamber and connections of one sort or another to the damper, such that the expansion and contraction of air in the chamber operate the damper; and I employ, also, a heating device to produce expansion of the air in the chamber when the movement which may be thus caused is desired; but instead of the shield adapted to be interposed between the heating device and the chamber and removed from that position by the operation of the thermostat, I employ a duct, which may receive the heating current from the heating device at one end, and discharge said current against the chamber at the other end, the relative position of the receiving end of the duct and the heating device being under control of mechanism operated by the thermostat, so that the heat may be conducted against the chamber or not, according to the temperature to which the thermostat is exposed.

P represents a flue, which may be either a ventilating flue from the apartment or a draft flue from the heater which warms it, H, being a check damper admitting air to the flue, thereby either ventilating the apartment or checking the fire in the heater. K is a lever arm of such damper by which it may be opened; F, a vessel containing water suspended from the free end of the arm K, having the air vent aperture Y, and connected at the bottom by a flexible tube J with the fixed vessel E, which contains water, and has connection from the top by the pipe S with the interior of the air chamber D, which may conveniently be suspended by that pipe connection from the fixed vessel E, the chamber D being preferably a hollow sphere made of thin copper or other metal, so that it may be quickly heated and cooled. Rise of temperature of the chamber D causing its contents to be expanded, tends to force the water out of the vessel E into the vessel F, and eventually tends by the weight of the water thus added to overbalance the damper H and cause it to be opened, and the cooling of the chamber D, reversing the process and permitting the water to flow out of the chamber F into the chamber E, permits the damper to close, as more particularly explained in my said application, Serial No. 476,160, filed May 31, 1893.

$G'$ $G^2$ and $G^3$ represent several plates of a thermostat, whose detail construction is more particularly set forth in my pending application, Serial No. 486,988, filed October 2, 1893. The outermost of said plates has a lever arm L, connected by the link N to the lever L', which is fulcrumed upon the arm U' of the upright post or bracket U, and is connected by the link N', at the lower end, to the lever arm $L^2$ near the fulcrum of the latter which is obtained upon the arm $U^2$ of the bracket U.

B B' is a duct, whose discharge mouth may be funnel-shaped, as shown, and located underneath the chamber D. The portion B' of said duct, which constitutes the receiving mouth, is secured to the upper end of the lever arm $L^2$, and adapted to be moved thereby toward and from the end of the portion B of the duct, which may be fixed with respect to the chamber D, the proximate ends of the two portions B and B' being preferably flanged so that the continuity of communication will be effected without material leakage at the joint, even though the registration at the point of meeting should not be accurate.

C represents the flame of a heating device which is here represented as a gas burner M, controlled by the valve M'. Any small heating device answers the purpose. In the form shown in Fig. 1, its position is fixed, being at the receiving end of the duct B B', when the movable part B' of said duct is in close connection with the fixed part making the duct continuous; but when the lever arm $L^2$ is moved so as to carry the part B' of the duct away from the part B, the receiving end is carried away from above the flame, so that the heated current produced by the latter no longer enters the duct and is no longer conducted against the chamber D, as it is when the mouthpiece or movable portion B' of the duct is in connection with the fixed portion and above the flame. Preferably, in order to obtain the greatest effect from the smallest flame, the side of the mouthpiece or movable portion B' of the duct is notched or apertured at b', so that as it moves over the flame, the flame passes through said notch and stands within the mouth, and is thereby protected from casual currents which might deflect the hot current and wholly or partly prevent it from passing up into the duct.

With respect to the thermostat G' $G^2$ $G^3$, it will be necessary only to say that it consists of any desired number of compound plates composed each of two elements having different coefficients of expansion and contraction by change of temperature, so that such change produces curvature of the compound plate, and consequent deflection of the lever arm L, with which the last plate is provided, the plurality of the plates and their connection to each other in the manner shown being designed to accumulate the effect described to the degree necessary to produce the desired motion of the mechanism operated by the lever L. A very obvious modification of this expedient consists in shifting the heating device instead of shifting the mouth of the duct. Such modification is seen in Fig. 2, wherein the duct is fixed throughout, and the lever arm $L^3$ at its upper portion constitutes the gas pipe from the end of which the flame issues, so that the flame is moved into and out of position to produce a hot current through the duct and against the chamber D.

I claim—

1. In a temperature regulator, in combination with a valve or damper whose position affects the temperature of the apartment to be regulated, the chamber D and mechanism by which the contraction and expansion of its contents operate the damper, a heating device, and a duct adapted to conduct the heated current therefrom against the chamber, the receiving mouth of the duct being movable, and mechanism adapted to move it to and away from the position at which it may receive the heated current from the heating device; a thermostat in the apartment to be regulated, and connections by which it actuates said mechanism: substantially as set forth.

2. In a temperature regulator, in combination with a valve or damper whose position affects the temperature of the apartment to be regulated, a chamber D and mechanism by which expansion and contraction of its contents operate the damper, the heating device; the duct adapted to conduct the heating current from the heating device against said chamber; mechanism by which the relative position of the heating device and the duct are controlled to cause the mouth of the duct to overhang the heating device or not, the receiving mouth of said duct being notched at one side to permit the heating device to pass in and out of the same laterally as the relative position is changed: substantially as and for the purpose set forth.

In testimony whereof I have hereunto set my hand, at Chicago, Illinois, this 27th day of September, 1893.

THOMAS O. PERRY.

Witnesses:
CHAS. S. BURTON,
JEAN ELLIOTT.